United States Patent Office 3,574,705
Patented Apr. 13, 1971

1

3,574,705
PREPARATION OF UNSATURATED ESTERS OF CARBOXYLIC ACIDS
Gustave B. Linden, Short Hills, N.J., and Walter Brooks, Whittier, Calif., assignors to Allied Chemical Corporation, New York, N.Y.
No Drawing. Filed Aug. 30, 1967, Ser. No. 664,275
Int. Cl. C07c 69/60, 69/80, 69/82
U.S. Cl. 260—475                                    9 Claims

ABSTRACT OF THE DISCLOSURE

Allylic esters of organic carboxylic acids are prepared by heating an alkali metal salt of an organic carboxylic acid with an allylic halide at a temperature of 55° to 80° C. in the presence of a zinc promoted copper catalyst.

---

The reaction of salts of carboxylic acids with organic halides to form esters is well known. For instance, it is known to prepare esters by reacting water-soluble partial esters of polycarboxylic acids with unsaturated halides. It is also known to prepare unsaturated esters of organic carboxylic acids by heating, at high temperatures, alkali metal salts of the acids with an unsaturated halide in aqueous medium at critical pH ranges. These processes, however, have distinct disadvantages in that the high volatility of the reactants requires the use of high pressure equipment which adds greatly to the cost of production. Moderate temperatures, on the other hand, have been found to be impractical in that the reaction time is quite lengthy and the yields are very low. The use of copper powder as a catalyst in the esterification reaction has also been mentioned in the prior art but, there too, higher temperatures were required.

Diallylic phthalates have been found to be useful in making plastic films and sheets. However, the known methods above, of preparing these phthalates have not been found economically feasible giving either low yields or, while giving better yields, requiring high process temperatures.

It is, therefore, an object of this invention to provide an efficient and economical process for producing allylic esters of organic carboxylic acids in high yields.

It had been thought that the use of copper metal, as shown in the prior art, would catalyze the esterification reaction. However, when the copper was employed as a catalyst, while the reaction proceeded initially, it soon stopped before all the reactants were utilized and the addition of further amounts of copper failed to reactivate the reaction.

It has now been discovered that a small amount of zinc added to the copper acts as a promoter for the copper and, indeed, produces a startling effect on its catalytic activity.

The process of this invention comprises heating, in the presence of a zinc promoted copper catalyst, at a temperature between about 55 and 80° C., preferably between 60 and 70° C., an alkali metal salt of an organic carboxylic acid with an allylic halide, preferably allyl chloride, in an aqueous medium, while maintaing the reaction mixture at a pH of 6.0 to 8.0, preferably 6.0 to 7, by the addition of an alkaline material, preferably hydroxide, and then recovering the desired allylic ester from the reaction.

The catalyst of this invention is composed of a major amount of copper and a minor amount of zinc which can be less than 1%. The catalyst should preferably be in finely divided particulate form, desirably finer than about 250 mesh. While as much as 5% zinc may be added, no advantage results from use of such large quantities, as smaller amounts work quite well. The zinc promoted copper catalyst can be in alloy form or a mixture of particles of the catalyst and particles of the promoter. A good catalyst is available commercially, and is sold as 44F Venus. It contains 95 to 96% copper and 3% zinc, and has a mesh size of 250 to 275.

As a result of catalysis the esterification process becomes operable at substantially lower temperatures, i.e., 55 to 80° C., than have been realized heretofore in the prior art. In addition, the use of the particular promoter-catalyst of the present invention, while allowing lower reaction temperatures, results in high yields of about 75 to 85%.

The carboxylic acids whose alkali metal salts are employed in the process of this invention may be aliphatic, aromatic or heterocyclic, saturated or unsaturated. They may also be monocarboxylic or polycarboxylic. Those acids preferred are isophthalic acid, orthophthalic acid, terephthalic acid, trimellitic acid, maleic acid and pyromellitic acid.

The salts of the acids are prepared by treating the acid with a suitable amount of an aqueous solution of a sodium or potassium base or basic salt, preferably sodium hydroxide. The salts of the acids may be separated from the resultant aqueous solution, or, more practically, the aqueous solution can be used directly in the process of the invention.

While any of the allylic halides may be employed in the process of this invention, allyl chloride is used preferably, as mentioned hereinabove.

The proportions of halide to salt in the reaction mixture may of course vary depending upon the reactants; however, according to one specific embodiment of the invention, i.e., preparation of diallylic phthalates it is obvious that at least 2 mols of allyl chloride would be required for each mol of disodium phthalate. The mol ratio of halide to salt may, however, range up to 4:1, and is preferably 3:1.

The reaction temperature is in the range of 55 to 80° C. and is considerably lower than noted in the prior art heretofore, resulting in a more economical process and reduced losses from polymerization.

Another advantage that results from the use of zinc promoted copper as a catalyst is that it is not necessary to employ a surface active agent during the esterification reaction, with a consequent reduction in emulsion problems during the isolation of the product. Recovery of the product may be by any conventional means, such as by distallation of the organic washed residue containing the desired ester.

Reaction times will vary depending upon the reaction conditions, but generally this period will be from 5 to 10 hours. Without the use of a zinc promoted copper catalyst the reaction produced low yields of ester in 24 hours whereas the use of the catalyst of this invention results in a five-fold increase in yield.

The invention will be described further in conjunction with the following specific examples but it is to be understood that these are merely or purposes of illustration and are not intended to limit the invention thereto.

EXAMPLE 1

30 mols of isophthalic acid were added to 60 mols of sodium hydroxide in 6 liters of water in a heated, glass-lined vessel equipped with a stirrer, at atmospheric pressure. The acid was stirred in over a period of about 1.5 hours and the mixture was then cooled to 70° C. The pH was 6.7. 4.8 grams of zinc promoted copper catalyst, 44F Venus, were added and the addition of 90 mols (7300 ml. of allyl chloride over a period of 5.5 hours was begun. Additions of 2.4, 4.8 and 2.4 grams of copper catalyst were made after 1¼, 2½ and 4 hours of reaction, respectively, when the rate of allyl chloride consumption dropped markedly. The reaction mixture was maintained at a temperature of about 68 to 70° C. for about 6 hours total reaction time. During this period, sodium hydroxide (40% aqueous solution) was added to the mixture at such rate that the pH was maintained at about 6.3 to 7.4.

The reaction mixture was cooled to about 45° C., and 6000 ml. of heptane were stirred into the reactor in a period of about 15 minutes. After a 20 minute interval to allow for formation of an organic layer and an aqueous layer, the aqueous layer was removed. The organic layer containing the diester was washed by shaking with a 12% aqueous solution of sodium carbonate. A rapid separation of a deep blue-green lower layer and a yellow-brown upper layer was effected. The lower layer containing an alkaline solution of copper complex was removed. The upper layer containing the diester was water-washed to neutral and then stripped of solvent to leave the diester as residue. The diester was further purified by vacuum distillation, in the presence of copper to inhibit polymerization.

The aqueous phases and any interface emulsions were also washed with heptane after filtration to recover any diester remaining therein.

A 74% total yield of diallyl isophthalate was obtained based on the amount of sodium isophthalate used. The product had a refractive index ($n_D^{25}$) of 1.522%.

EXAMPLE 2

2.5 mols of phthalic acid were added to 203 grams of sodium hydroxide in 250 ml. of water. The pH of the resulting mixture was 6.8. 0.4 gram 44F Venus copper powder was added to the mixture and the addition of 7.5 mols of allyl chloride (50% excess) over a period of 5.5 hours was begun. Additions of 0.2 gram of the copper powder were made 2.75 and 4.25 hours after the start of the allyl chloride addition. The reaction mixture was maintained at a temperature of about 67–70° C. and at a pH of between 6.3 and 6.5. During this period, about 58 grams of 45% sodium hydroxide were added to control the pH. The pH was then raised to 7.1 with additional sodium hydroxide and the mixture was refluxed for about 30 minutes.

500 ml. of benzene were added to the reaction mixture which was stirred for 15 minutes and allowed to settle. After standing, the organic layer was separated from the aqueous layer. The organic layer was washed with aqueous sodium carbonate solution resulting in the formation of two layers. The lower layer containing an alkylene solution of copper complex was removed. The upper layer containing the diester was washed and then stripped of solvent leaving the diester as residue.

The aqueous phases and any interfacing emulsions were also washed with benzene after filtration to recover any diester remaining therein.

An 83% total yield of diallyl phthalate was obtained based on the amount of sodium phthalate used.

EXAMPLE 3

30 mols of trimellitic acid were added to 90 mols of sodium hydroxide in 9 liters of water in a reactor as described in Example 1. Thereafter, the procedure was that of Example 1 with the exception that 120 mols of allyl chloride were added, and the total reaction time was about 10 hours. A 75% yield of the triallyl ester was obtained.

EXAMPLE 4

Diallyl phthalate 30 mols of phthalic anhydride were added with stirring to 60 mols of sodium hydroxide in 6 liters of water in a heated, glass lined reactor, at 70° C. One gram of zinc promoted copper catalyst was added to the resulting reaction mixture. 90 mols (7300 ml.) of allyl chloride were then added over a period of 5.5 hours, with 40 wt. percent sodium hydroxide being added as required to maintain a pH of about 6.5. Additional 0.2 gram portions of catalyst were added when the reaction slowed markedly. The reaction product was treated as in Example 1 and resulted in an excellent yield of diallyl phthalate.

EXAMPLE 5

Diallyl maleate 30 mols of maleic anhydride was added with stirring to 60 mols of sodium hydroxide in 20 liters of water in a glass-lined jacketed reactor. The temperature was brought to 70° C. and one gram of copper zinc catalyst was added. Allyl chloride, 90 mols, was then slowly added as 40% sodium hydroxide was supplied to keep the pH of the reactants at about 6.5. Additional 0.5 gram increments of catalyst were added when the rate of reaction slowed markedly. The reaction product was treated as in Example 1 and resulted in an excellent yield of diallyl maleate.

In each of the foregoing examples, the pressure was substantially atmospheric during the ester forming reaction.

What is claimed is:

1. In a process for producing an allylic ester of an organic carboxylic acid by heating at a temperature of at least 55° C. an alkali metal salt of an aliphatic or aromatic polycarboxylic acid with an allylic chloride in an aqueous medium at a pH between about 6 and 8 and recovering the resultant unsaturated ester therefrom, the improvement which comprises conducting the reaction in the presence of a finely divided zinc promoted metallic copper catalyst containing up to about 5% zinc.

2. A process according to claim 1 wherein the heating is carried out at a temperature of from 55° to about 80° C.

3. A process according to claim 1 wherein the alkali metal salt of the acid is selected from the group consisting of isophthalic acid, orthophthalic acid, terephthalic acid, trimellitic acid, fumaric acid, maleic acid and pyromellitic acid.

4. A process according to claim 3 wherein said catalyst comprises 95 to 96% by weight metallic copper, about 3% by weight zinc and has a particle size between about 250 and 275 mesh.

5. A process according to claim 3 wherein the mol ratio of said alkali metal salt to the allylic chloride is between about 1:2 and 1:4.

6. A process according to claim 3 wherein the acid is trimellitic acid.

7. A process according to claim 3 wherein the pH is maintained in the range 6–7.

8. A process according to claim 3 wherein the heating is carried out at a temperature of from 55° to about 80° C.

9. In a process for producing diallyl isophthalate by heating the disodium salt of isophthalic acid with allyl chloride in a mol ratio of 1:3 in an aqueous medium at a pH between about 6–7 and recovering the resultant diallyl isophthalate therefrom, the improvement which comprises conducting the reaction at 60–70° C. in the presence of a finely divided zinc promoted metallic copper catalyst containing up to about 5% zinc.

References Cited

FOREIGN PATENTS 1,372,967 8/1964 France _____ 260—475
1,031,019 5/1966 Great Britain _____ 260—475

LORRAINE A. WEINBERGER, Primary Examiner

E. J. SKELLY, Assistant Examiner

U.S. Cl. X.R.

260—476, 485, 486, 491